US005577191A

United States Patent [19]

Bonomi

[11] Patent Number: 5,577,191
[45] Date of Patent: Nov. 19, 1996

[54] SYSTEM AND METHOD FOR DIGITAL VIDEO EDITING AND PUBLISHING, USING INTRAFRAME-ONLY VIDEO DATA IN INTERMEDIATE STEPS

[75] Inventor: Mauro Bonomi, Palo Alto, Calif.

[73] Assignee: Minerva Systems, Inc., Santa Clara, Calif.

[21] Appl. No.: 197,914

[22] Filed: Feb. 17, 1994

[51] Int. Cl.⁶ .............................. G06K 9/36; H04N 11/04
[52] U.S. Cl. ........................ 395/502; 348/384; 382/166
[58] Field of Search ................................. 395/154, 115, 395/163, 162, 164; 382/56, 304, 305, 166, 233; 348/415, 396, 384, 405, 419, 420, 409; 358/426, 433, 432, 479

[56] References Cited

U.S. PATENT DOCUMENTS

| | | | |
|---|---|---|---|
| 4,791,680 | 12/1988 | Yokoe et al. | 382/56 |
| 4,903,317 | 2/1990 | Nishihara et al. | 382/56 |
| 5,185,819 | 2/1993 | Ng et al. | 382/56 |
| 5,212,742 | 5/1993 | Normile et al. | 382/166 |
| 5,216,754 | 6/1993 | Sathi et al. | 395/113 |
| 5,253,078 | 10/1993 | Balkanski et al. | 358/426 |
| 5,379,356 | 1/1995 | Purcell et al. | 382/233 |
| 5,392,072 | 2/1995 | Rodriguez et al. | 348/405 |
| 5,461,679 | 10/1995 | Normile et al. | 382/304 |

Primary Examiner—Heather R. Herndon
Assistant Examiner—Joseph R. Burwell
Attorney, Agent, or Firm—Skjerven, Morrill, MacPherson, Franklin & Friel; Edward C. Kwok

[57] ABSTRACT

A system for digital video editing and publishing is disclosed including a video capture unit, a video compression unit, and video decompression unit coupled to a host computer having video editing capabilities. This system allows video editing to occur using intraframe-only compressed video data. The edited video data can then be decompressed and recompressed to provide compressed data, which is compressed using both interframe and intraframe operations, usable for publication in a removal storage medium, such as a compact disk or a data network.

8 Claims, 3 Drawing Sheets

SYSTEM AND METHOD FOR DIGITAL VIDEO EDITING AND PUBLISHING, USING INTRAFRAME-ONLY VIDEO DATA IN INTERMEDIATE STEPS

BACKGROUND OF THE INVENTION

1. Field of the Invention

This invention relates to the editing and publishing of video data; and, in particular, relates to the design of systems using image data compression and decompression techniques for editing and publishing of video data.

2. Discussion of the Related Art

2.1 Compression

In the present state of the art, digital video data are highly compressed to minimize the requirement for storage resources. To achieve a high compression ratio, both interframe and intraframe compression algorithms are typically applied to a video sequence. Intraframe compression is achieved by minimizing information redundancy within a frame, and sacrificing some image definition. By contrast, interframe compression removes temporal redundancy in the video sequence. Various standards are accepted today using both intraframe and interframe techniques for video data compression. One such standard is the MPEG (Motion Picture Experts Group) standard. Within the MPEG standard intraframe compression is applied to a selected number of frames ("I-frame") in a video sequence. Using the I-frames as references, interframe compression within the video sequence is accomplished by encoding the incremental differences between frames. Such incrementally encoded frames are called "P-frames or predicted frames", when the incremental difference encoded in each frame relates to either a previous or future frame. Alternatively, when the incremental difference encoded in each frame relates to both a future and a previous frame, such frames are called "B-frames or bidirectional frames". P-frames can also serve as bases for encoding other P frames and B-frames.

Another standard that is also widely adopted is the JPEG (Joint Photographic Experts Group) standard, which does not provide for interframe compression. Naturally, JPEG does not achieve the high compression ratio achieved under the MPEG standard. Typically, for the same quality in the resulting image, MPEG interframe compression achieves several times the compression ratio achieved in a JPEG compression.

2.2 Video Editing

Commercial video sequences, such as motion pictures, advertising, or music videos, are heavily edited after the images are captured. Typical editing activities include special effects, titling, mixing, fades and wipes. At present, a video sequence is usually first captured on tape in "analog" form, which is then digitized for editing. Editing can occur in a large post-production facility with special equipment to perform each of the various functions, such as mixing, titling, and other special effects. Currently, to preserve the quality of the video sequence, video editing occur at the full definition of the digitized images (i.e. no compression). When editing is completed the video sequence is once again converted to analog form on a "master" tape, which is then duplicated for publishing.

The cost of the video editing procedures described above is expensive primarily because of the high cost of the full-definition editing equipment. Typically, customers of a post-production facility are charged for the time they are "on-line," i.e. the time during which the video editing equipment is used. In the future, it is believed that the use of both video compression techniques and the increasing power of the personal computer can lead to lower cost of video editing.

Video editing requires random access to frames. Because of this requirement, the interrelated nature of frames under an interframe compression scheme renders the use of interframe compressed video as input data to video editing impractical. Thus, existing video editing systems use only intraframe compressions to compress frames. Recently, JPEG-based video editing software programs and hardware accelerators are available on personal computers to mimic the activities in the post-production facility. Such programs, although not providing the image definition necessary for production quality editing, provide a mock edit session "off-line." The result of such a mock edit session is a machine-readable "edit decision list" file, which can be used to automatically direct an edit session, using the production quality equipment at the post-production facility. In this manner, on-line time, hence cost of video editing, is significantly reduced.

1.3 Digital Video Publishing

As mentioned above, video sequences are usually published today on a tape. Recently advances in image processing integrated circuits provide MPEG decoders to decode high quality digital video sequences at relatively low bit-rates, which can be stored on a compact disk ("CD"), distributed on a phone line, or delivered over a local area network. For digital video distribution ("video publishing"), the edited video sequence, which is stored today on a master tape, must be redigitized and compressed under an interframe compression standard. There is a need for a system available on the desktop to provide both video editing and publishing.

SUMMARY OF THE INVENTION

In accordance with the present invention, a method for desktop video publishing first compresses digital frame data, intraframe-only, to allow video editing. When video editing is completed, the edited compressed digital video data are retrieved from a storage medium, decompressed, and then recompressed under both intraframe and interframe compression algorithms. In this process, the intervening step of creating an analog master tape is eliminated.

In accordance with the present invention, a system for desk top publishing includes (i) a video capture circuit for receiving video data, in either analog or digital form; (ii) a video compression circuit; (iii) an interface to a host processor; and (iv) a video decompression circuit. According to the present invention, the video capture circuit receives either digital or analog video data, and outputs compressed digital video data. The video compression circuit can compress the video data either intraframe-only or using both interframe and intraframe algorithms. The video decompression circuit decompresses intraframe-only compressed video data to allow video editing to occur in the host processor. When the video editing completes, the video decompression circuit forwards decompressed data to the video compression circuit to compress the video data using both intraframe and interframe algorithms. Thus, the present invention provides a single system capable of performing video editing and publishing entirely in the digital domain.

In accordance with another aspect of the present invention, digital filtering can be performed on the decompressed edited video files, using hardware or software digital filters.

The present invention is better understood upon consideration of the following detailed description and the accompanying drawings.

BRIEF DESCRIPTION OF THE DRAWINGS

FIG. 3b is a block diagram of video encoder board 300a.

DETAILED DESCRIPTION OF THE PREFERRED EMBODIMENTS

Figure 1:
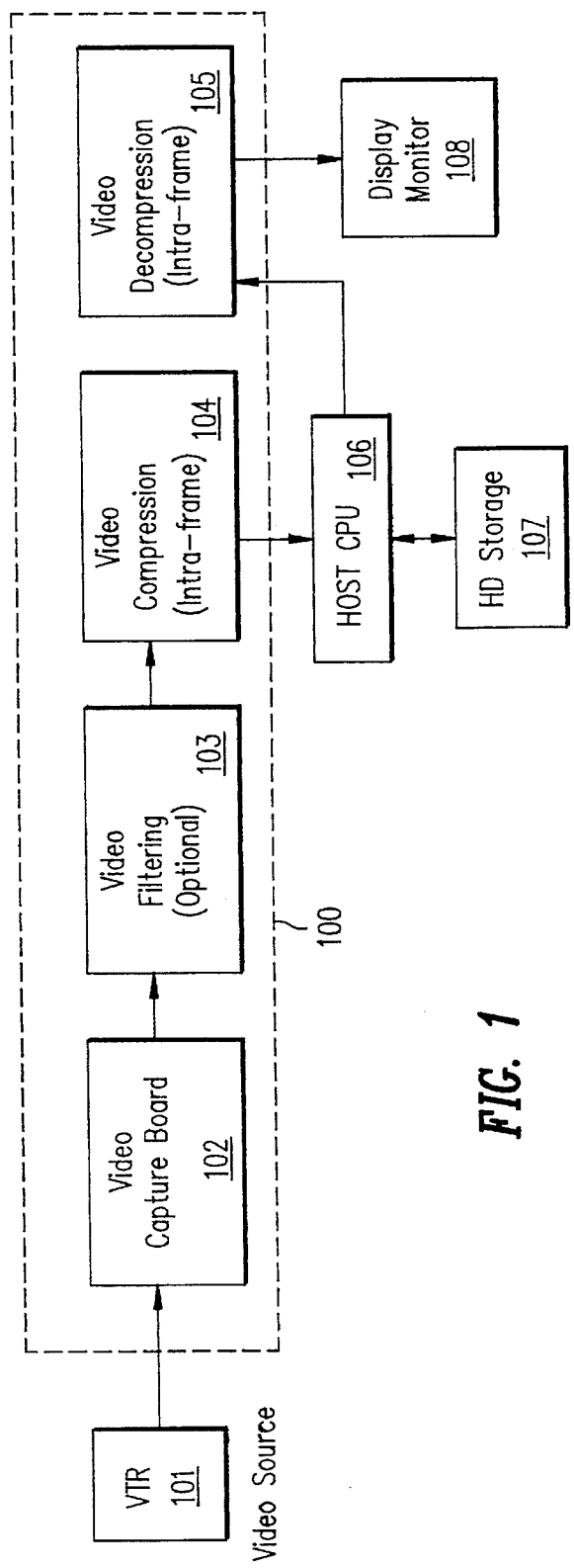
FIG. 1 is a block diagram of a system 100 which allows both video editing and digital publishing on the desk top, in accordance with the present invention.

The present invention provides a system and a method for selectably providing both video editing and digital video publishing. Accordingly, FIG. 1 shows a block diagram of a system 100, which allows both video editing and publishing using a host desk top computer. As shown in FIG. 1, system 100 includes a video capture circuit 102, a video filter 103 (optional), and video compression and decompression units 104 and 105. Video compression and decompression units 104 and 105 can be selectably set to process either intraframe-only compression or both intraframe and interframe compressions. System 100 is controlled by a host processor 106 communicating with system 100 over a data bus (not shown). Through host processor 106, system 100 has access to a storage device 107. Video decompression unit 105 provides either digital or analog video output signals suitable for display by display monitor 108. FIG. 1 also shows the data flow in system 100, when configured to provide video editing functions.

As configured in FIG. 1, system 100 receives video data from an analog source. Such an analog source can provide video signals in SECAM, PAL or NTSC signal formats commonly used in broadcast or cable television. Video capture circuit 102 digitizes the input video signals and provides as output digital video data to filter module 103.

Filter module 103 provides an optional filtering step to preprocess digitized video data. The filter video data is then compressed intraframe-only by compression unit 104 under the control of host computer 106. The intraframe compressed video data is then stored in a storage device, such as a hard disk. Optionally, the compressed video data can also be provided to video decompression unit 105, which can then decompressed the video data to display the video images on display monitor 108. One of ordinary skill in the art would appreciate that the intraframe-only compression and decompression operations are provided in real time, i.e. at the same rate as video signals received from video source 101. Real time compression and decompression capabilities can be provided, for example, using the CLM4500 encoder and the CL450 decoder integrated circuits, respectively. Both the CLM4500 encoder and the CL450 decoder are available from C-Cube Microsystems, Milpitas, Calif.

Video editing can be accomplished using video editing software running in host processor 106. An example of such video editing software is Premiere from Adobe Systems, Mountain View, Calif. During editing, host computer 106 retrieves selected frames of compressed video data from storage device 107, and provides the compressed video data to decompression unit 105 for both decompression and display on display monitor 108. The video editing software running in host processor 106 provides the familiar video editing functions on the decompressed video frames and returns, when needed, the edited video frames back to storage device 107, after intraframe-only compression by video compression unit 104. In this manner, an edited digital "master" file in intraframe-only compressed data format can be created. The parameters of the intraframe compression used in creating this digital master file are set such that the decompressed image is of a selected quality (i.e., resolution or definition) commensurable with the target publication medium. For example, for publishing the video data as an analog tape for cinematic performance, the parameters are set for a less lossy compression than would be required for publishing the video data as a VHS format tape for home viewing.

Figure 2:
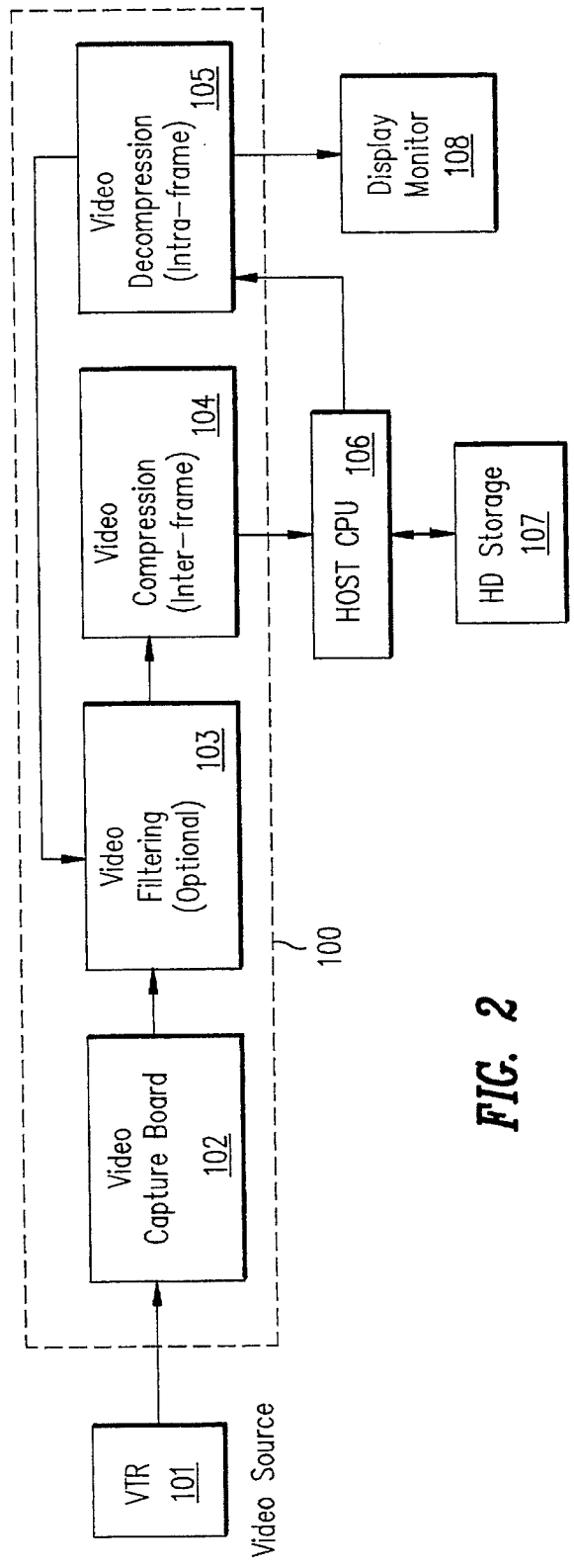
FIG. 2 shows the video data flow in system 100 configured to provide both intraframe and interframe compression.

Upon completion of video editing, the master file is ready for publishing in the target medium. Publishing in the digital video domain involves the step of further compression using both interframe and intraframe compression operations. FIG. 2 shows the video data flow in system 100 configured to provide both intraframe and interframe compression.

As shown in FIG. 2, intraframe-only compressed video data is retrieved from storage device 107 and provided to decompression unit 105 to decompress. The decompressed image can be optionally displayed on display monitor 108 for viewing. The decompressed data is then fed back to video filter 103 for an optional filtering step. Such filtering step, for example, can be used to alleviate certain compression artifacts, such as blocking.

The filtered data is then compressed using both intraframe and interframe capabilities of video compression unit 104. The compression parameters are, of course, set to provide the expected image quality for the target medium. As mentioned above, in one implementation, the encoder (e.g. the CLM4500) in compression unit 104 is capable of providing real time compression of the video data, although real time capability is not necessary for the present application. The compressed video data output of compression unit 104 provides a highly compressed digital file which can be distributed in a digital publication medium, such as a CD. This digital file can be stored in storage device 107, or be directly transmitted to a manufacturing process for creating the publication medium (e.g. writing a CD on a CD presser).

Figures 3A, 3C:
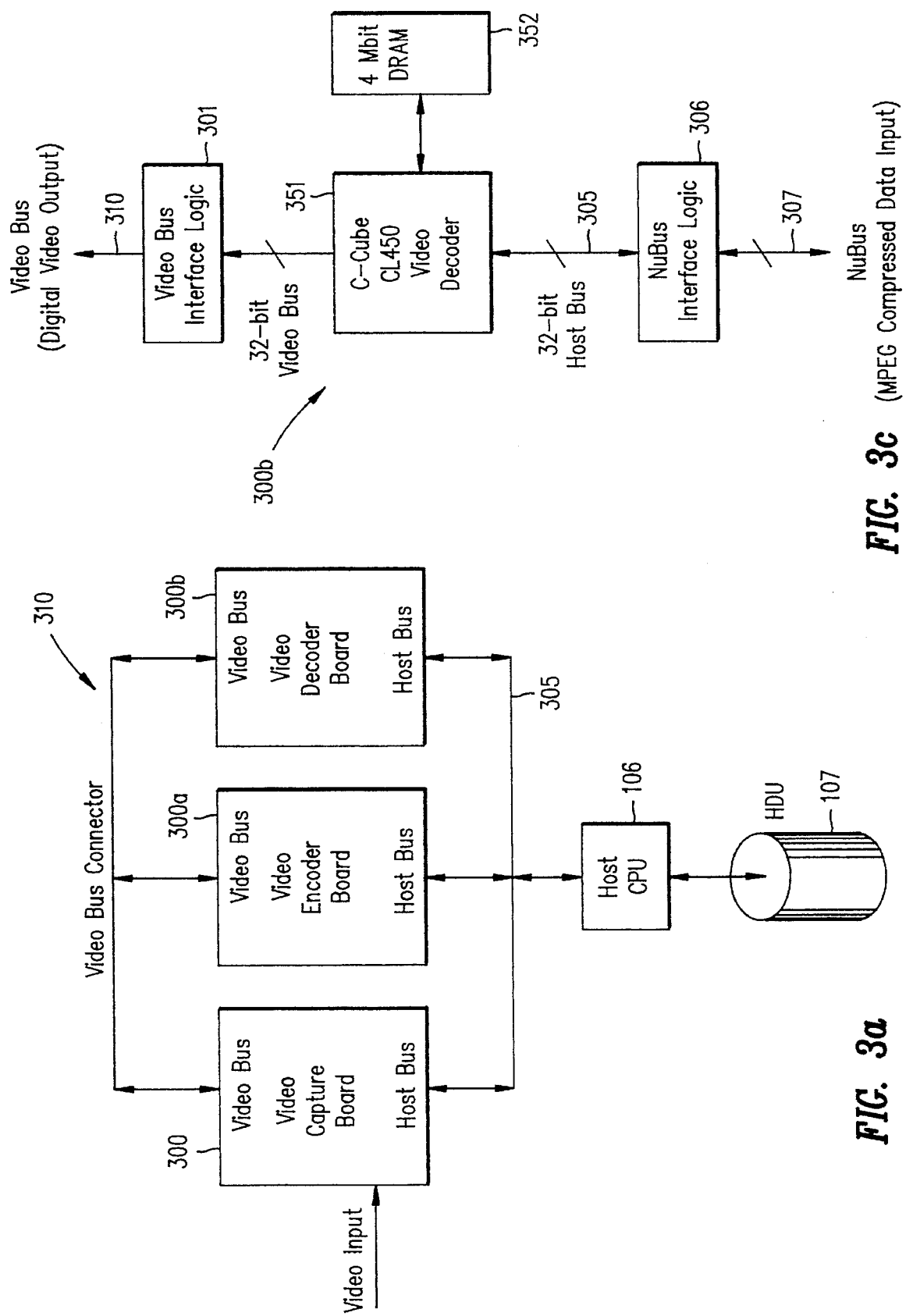
FIG. 3a shows an implementation of system 100 using a video capture board 300, a video encoder board 300a and a video decoder board 300b.
FIG. 3c is a block diagram of video decoder board 300b.

FIG. 3a is a block diagram of an implementation of system 100, using a video capture board 300, a video encoder board 300a and a video decoder board 300b for accomplishing the functions of FIG. 1's video compression unit 104 and video decompression unit 105, respectively. Video capture board 300, video encoder board 300a and video decoder board 300b are all interfaced to a 32-bit video bus 310. Video capture board 300 can be provided by a video capture board (not shown), such as the Video Explorer Capture Board from Intelligent Resources, Inc. Each board communicates over a "host bus" 305 with a host processor such as a Macintosh computer from Apple Computer Inc., and a mass data storage medium, such as a hard disk. If the host computer is a Macintosh computer, the NuBus can be used as host bus 305. A video capture board, such as the Video Explorer Capture Board, typically accepts both digital and analog video signals. The analog video signals are digitized for further processing under system 100.

Figure 3B:
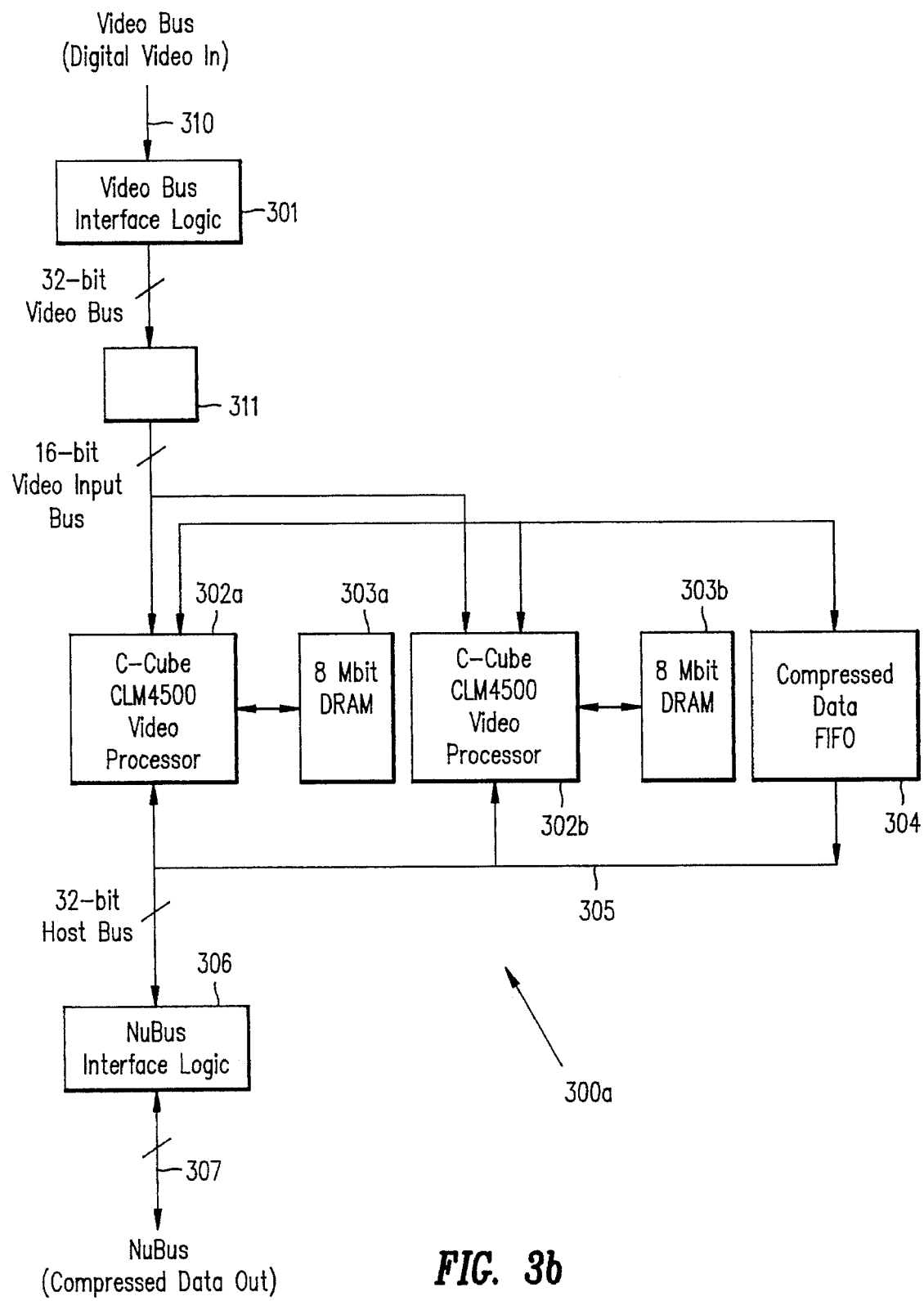

FIG. 3b is a block diagram of video encoder board 300a. As shown in FIG. 3b, digital video is received into encoder board 300a by video bus interface logic 301 over video bus 310. Video bus 310 is a high-speed dual 32-bit channel interface bus connecting the video capture board 300, video encoder board 300a and video decoder board 300b. The incoming video signal is converted, if necessary, from an RGB color space to the YUV color space by a color space converter 311, such as the BT281, available from Brooktree Corporation. The converted video signals are then provided 16 bits at a time to an MPEG encoding circuit, which can be provided by two C-Cube CLM4500 video processor integrated circuits 302a and 302b connected in parallel. Each CLM4500 integrated circuit has access to an 8M-bit dynamic random access memory (DRAM), illustrated in FIG. 3b as DRAM 303a or 303b. Depending on whether video editing or publishing is performed, video processor integrated circuits 302a and 302b perform either intraframe compression, or both intraframe and interframe compressions. The compressed data are provided to a first-in-first-out memory (FIFO) 304 for transmission over a 32-bit host bus 305 to the host computer. In FIG. 3b, the interface to the NuBus 307 is provided by Nubus interface logic 306.

FIG. 3c is a block diagram of video decoder board 300b. As shown in FIG. 3c, compressed video data are sent to the decoder processor board 300b over NuBus 307. Such compressed video data is either intraframe compressed video data, or both interframe and intraframe compressed video data. A video decoder integrated circuit 351, such as the C-Cube CL450 video decoder from C-Cube Microsystems, Inc., decodes the compressed video data and outputs the decoded data onto 32-bit video bus 310. Video decoder integrated circuit 351 is provided with a 4M-bit DRAM 352 for storing intermediate results. The decoded digital video data may be converted to analog digital video signals for display on a video monitor, or be provided to video encoder board 300a for further compression. In the implementation described above, MPEG intraframe decoding and MPEG intraframe and interframe encodings can be performed simultaneously in real time.

The above detailed description is provided to illustrate the specific embodiments of the present invention and is not intended to be limiting. Numerous modifications and variations within the scope of the present invention are possible. For example, even though the above description provides CDs as an example of a digital video publication medium, the present invention is applicable also to real time delivery of high quality video data, such as digital broadcast or cable television transmission. As another example, even though software programs are used to illustrate video editing under control of a host processor, the system and method of the present invention are also applicable to a system in which special coprocessing hardware are provided to perform video editing functions. The present invention is defined by the following claims.

We claim:

1. A method for desktop video publishing, comprising the steps of:

providing digital video data representing a video sequence;

compressing, intraframe-only, said digital video data, and storing said compressed digital video data in a storage medium;

retrieving said intraframe-only compressed digital video data from said storage medium;

decompressing selected frames of said intraframe-only compressed digital video data;

performing video editing functions of said decompressed selected frames to create an edited video sequence;

recompressing said decompressed selected frames, intraframe-only, and storing said recompressed selected frames back into said storage medium;

retrieving from said storage medium frames of said edited video sequence;

decompressing said frames of said edited video sequence; and compressing, using both intraframe and interframe compression operations, said decompressed frames of said edited video sequence.

2. A method as in claim 1, further comprising, between said step of decompressing said frames of said edited video sequence and said step of compressing, using both interframe and intraframe compression operations, the step of filtering said decompressed frames of said edited video sequence using a digital video filter.

3. A method as in claim 1, wherein said step of providing digital video data comprises the step of digitizing analog input video signals.

4. A system for video publishing, said system receiving digital video data representing a video sequence, said system comprising:

a video compression circuit, coupled to receive said digital video data and a second source of digital video data, said video compression unit being selectably configured for compressing digital video data received to provide (a) intraframe-only compressed video data, and (b) intraframe and interframe compressed video data;

means, coupled to said video compression unit, for transferring between a host processor and said system for video publishing said intraframe-only compressed video data and said intraframe and interframe compressed video data; and a video decompression circuit, coupled to receive from said means for transferring said intraframe-only compressed video data, said video decompression unit decompressing said intraframe-only video data and providing said decompressed video data to said video compression circuit as said second source of digital video data.

5. A system as in claim 4, further comprising a digital filter for filtering said digital video data from said video capture circuit.

6. A system as in claim 4, wherein said video capture circuit further comprises a digitizing circuit for providing said digital video data from analog video signals of a video signal source.

7. A system as in claim 4, wherein said means for transferring further comprises means for transferring decompressed data between said host processor and said system for video publishing, said host processor providing video editing on said decompressed data.

8. A system as in claim 4, further comprising means for creating a removable digital storage media, said means for creating being coupled to said host processor to receive said intraframe and interframe compressed video data and storing said intraframe and interframe compressed video data received in said removable digital storage media.

* * * * *